US012594651B2

(12) United States Patent
Chikaraishi

(10) Patent No.: US 12,594,651 B2
(45) Date of Patent: Apr. 7, 2026

(54) ELECTRIC WORK MACHINE AND SCREWING TOOL

(71) Applicant: MAKITA CORPORATION, Anjo (JP)

(72) Inventor: Makoto Chikaraishi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 357 days.

(21) Appl. No.: 18/220,512

(22) Filed: Jul. 11, 2023

(65) Prior Publication Data

US 2024/0100666 A1 Mar. 28, 2024

(30) Foreign Application Priority Data

Sep. 26, 2022 (JP) ................................ 2022-152797

(51) Int. Cl.
*B25B 23/18* (2006.01)
*B25B 21/00* (2006.01)
*F21V 33/00* (2006.01)

(52) U.S. Cl.
CPC .............. *B25B 23/18* (2013.01); *B25B 21/00* (2013.01); *F21V 33/008* (2013.01); *F21V 33/0084* (2013.01)

(58) Field of Classification Search
CPC ....... B25B 23/18; B25B 21/00; F21V 33/008; F21V 33/0084
USPC .......................................................... 362/119
See application file for complete search history.

(56) References Cited

U.S. PATENT DOCUMENTS 5,984,485 A * 11/1999 Poli ...................... G02B 6/0055 362/625
6,874,921 B2 * 4/2005 Verlage .................... B60Q 3/64 362/489
6,910,783 B2 * 6/2005 Mezei .................. G02B 6/0021 362/555
7,815,356 B2 * 10/2010 Lutz ........................ B25F 5/021 362/572
8,246,228 B2 * 8/2012 Ko ....................... G02B 6/0061 362/559
2003/0026106 A1 * 2/2003 Knaack .................. G02B 6/001 362/555
2016/0354889 A1 12/2016 Ely et al.
2018/0126538 A1 5/2018 Qiu et al.
2022/0388141 A1 * 12/2022 Xu ...................... F21V 33/0084

* cited by examiner

*Primary Examiner* — Laura K Tso
(74) *Attorney, Agent, or Firm* — Oliff PLC

(57) ABSTRACT

An intended illumination area is illuminated with light. An electric work machine includes a motor including a rotor rotatable about a rotation axis extending in a front-rear direction, an output unit located frontward from the motor and operable under a rotational force from the rotor, a light emitter, and an optical member including at least one light receiver that receives light from the light emitter and a light guide surrounding at least a part of the output unit to allow light from the at least one light receiver to travel through the light guide. The light guide has a rear surface having at least one slit, and a front surface to allow emission of light traveling through the light guide and reflected at the at least one slit.

11 Claims, 13 Drawing Sheets

ELECTRIC WORK MACHINE AND SCREWING TOOL

CROSS-REFERENCE TO RELATED APPLICATIONS

This application claims the benefit of priority to Japanese Patent Application No. 2022-152797, filed on Sep. 26, 2022, the entire contents of which are hereby incorporated by reference.

BACKGROUND

1. Technical Field

The present disclosure relates to an electric work machine and a screwing tool.

2. Description of the Background

In the technical field of electric work machines, an illumination system for a power tool is known as described in U.S. Patent Application Publication No. 2016/0354889.

BRIEF SUMMARY

An operator can smoothly perform an operation using an electric work machine that illuminates an operation target in, for example, a dark place. An intended illumination area is illuminated with light to increase operability.

One or more aspects of the present disclosure are directed to illuminating an intended illumination area with light.

A first aspect of the present disclosure provides an electric work machine, including:

- a motor including a rotor rotatable about a rotation axis extending in a front-rear direction;
- an output unit located frontward from the motor and operable under a rotational force from the rotor;
- a light emitter; and
- an optical member including
  - at least one light receiver configured to receive light from the light emitter, and
  - a light guide surrounding at least a part of the output unit to allow light from the at least one light receiver to travel through the light guide, the light guide having
    - a rear surface having at least one slit, and
    - a front surface to allow emission of light traveling through the light guide and reflected at the at least one slit.

A second aspect of the present disclosure provides a screwing tool, including:

- a brushless motor including a stator and a rotor rotatable relative to the stator;
- a reducer located frontward from the rotor, the reducer being configured to reduce rotation of the rotor;
- an output shaft located frontward from the reducer and rotatable by the reducer;
- a case accommodating the reducer and supporting the output shaft in a rotatable manner;
- a light emitter; and
- an annular optical member held on the case, the annular optical member including
  - a light receiver configured to receive light from the light emitter, and
  - a plurality of reflectors configured to reflect light from the light receiver.

The technique according to the above aspects of the present disclosure allows illumination of an intended illumination area with light.

DETAILED DESCRIPTION

One or more embodiments will now be described with reference to the drawings. In the embodiments, the positional relationships between the components will be described using the directional terms such as right and left (or lateral), front and rear (or frontward and rearward), and up and down (or vertical). The terms indicate relative positions or directions with respect to the center of an electric work machine.

Electric Work Machine

Figure 1:
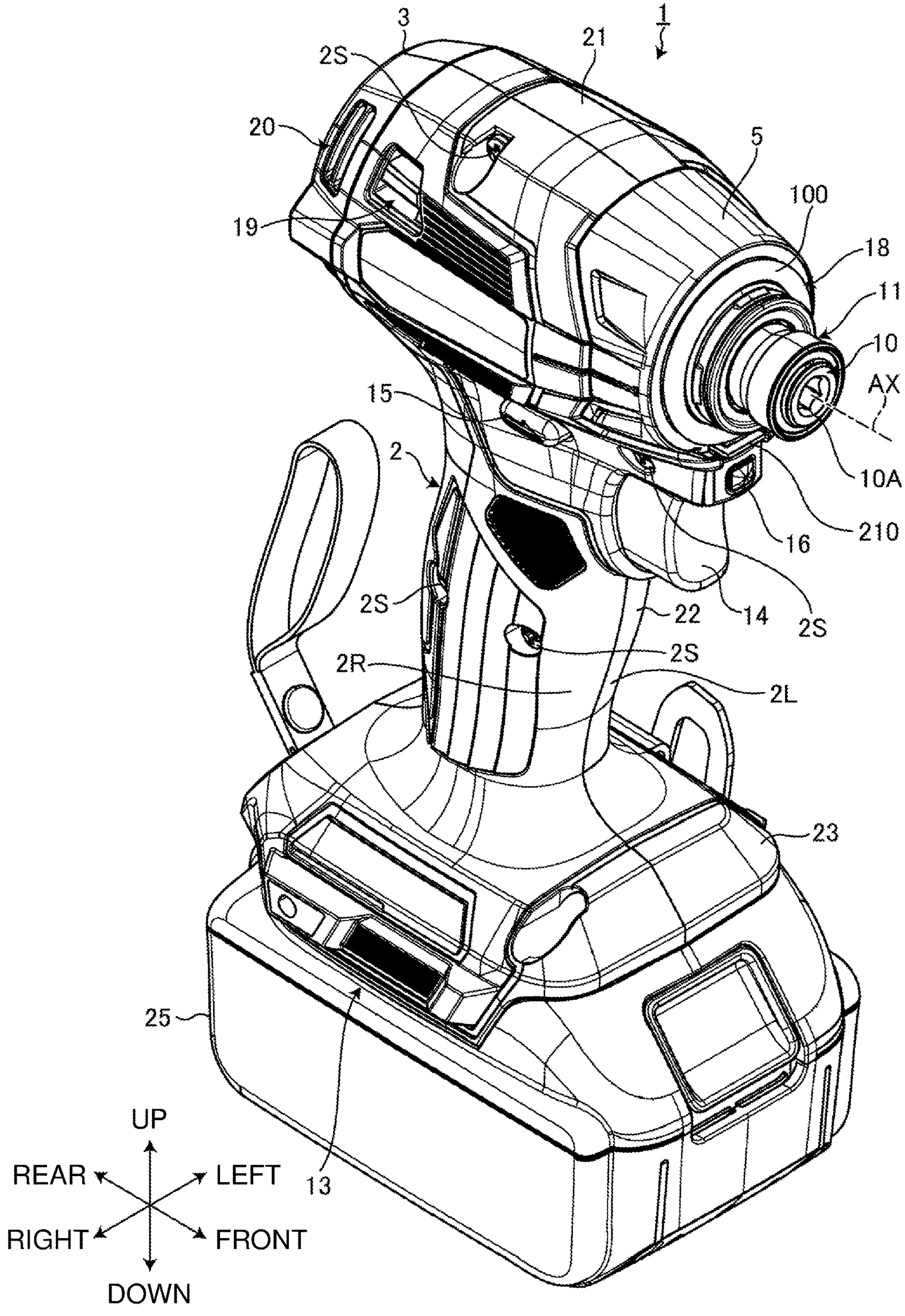
FIG. 1 is a perspective view of an electric work machine according to an embodiment as viewed from the front.
Figure 2:
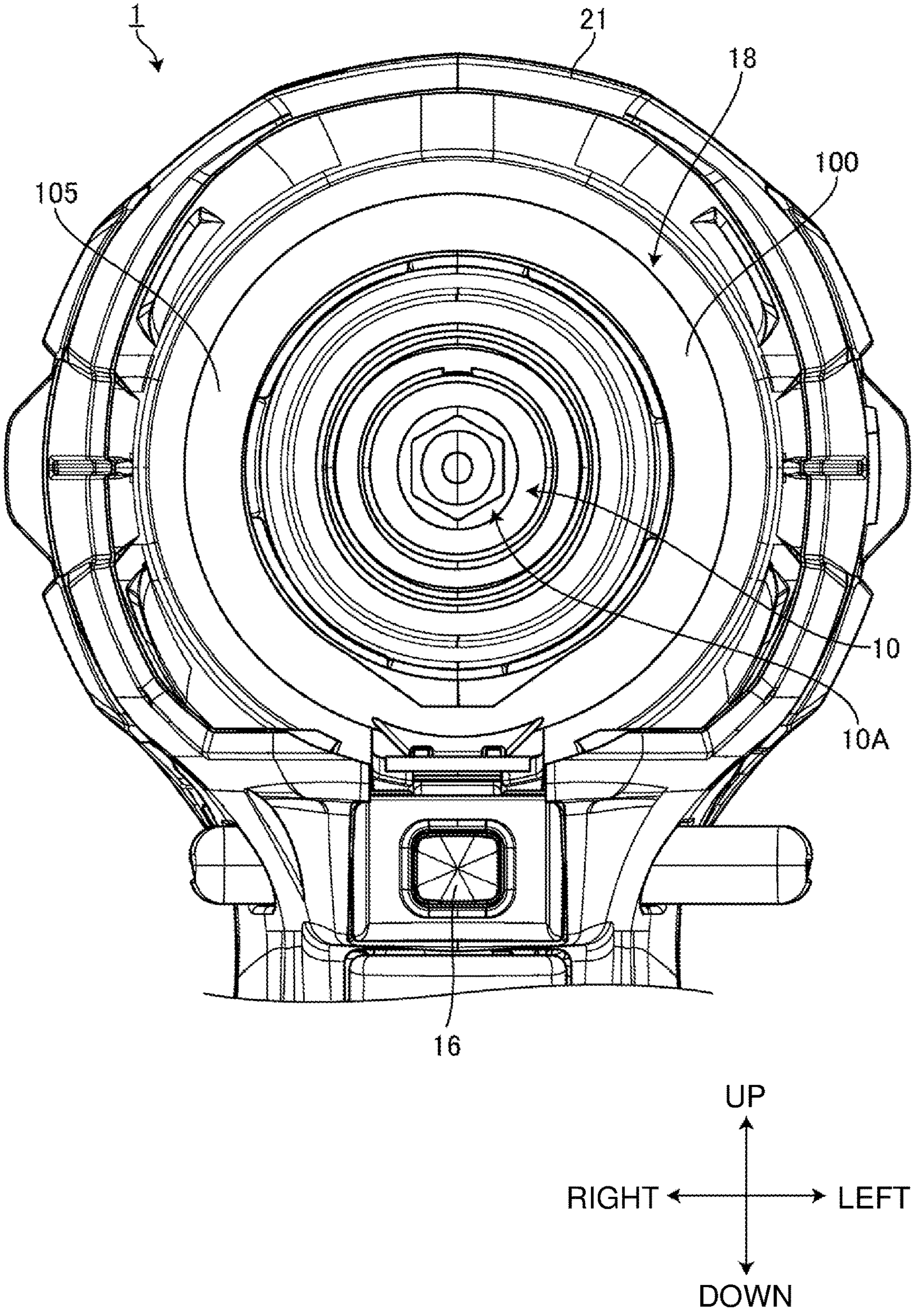
FIG. 2 is a front view of an upper portion of the electric work machine according to the embodiment.
Figure 3:
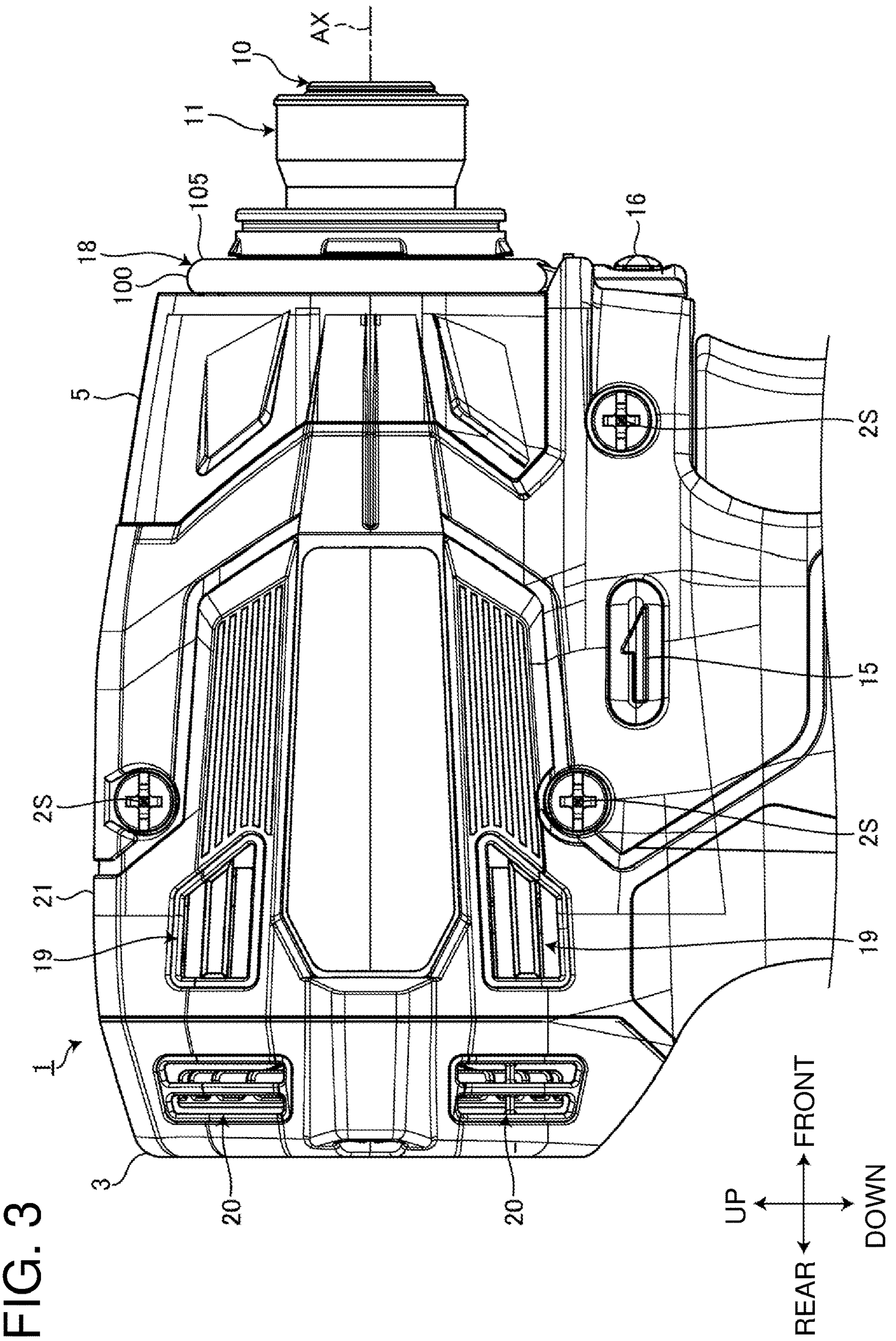
FIG. 3 is a side view of the upper portion of the electric work machine according to the embodiment.
Figure 4:
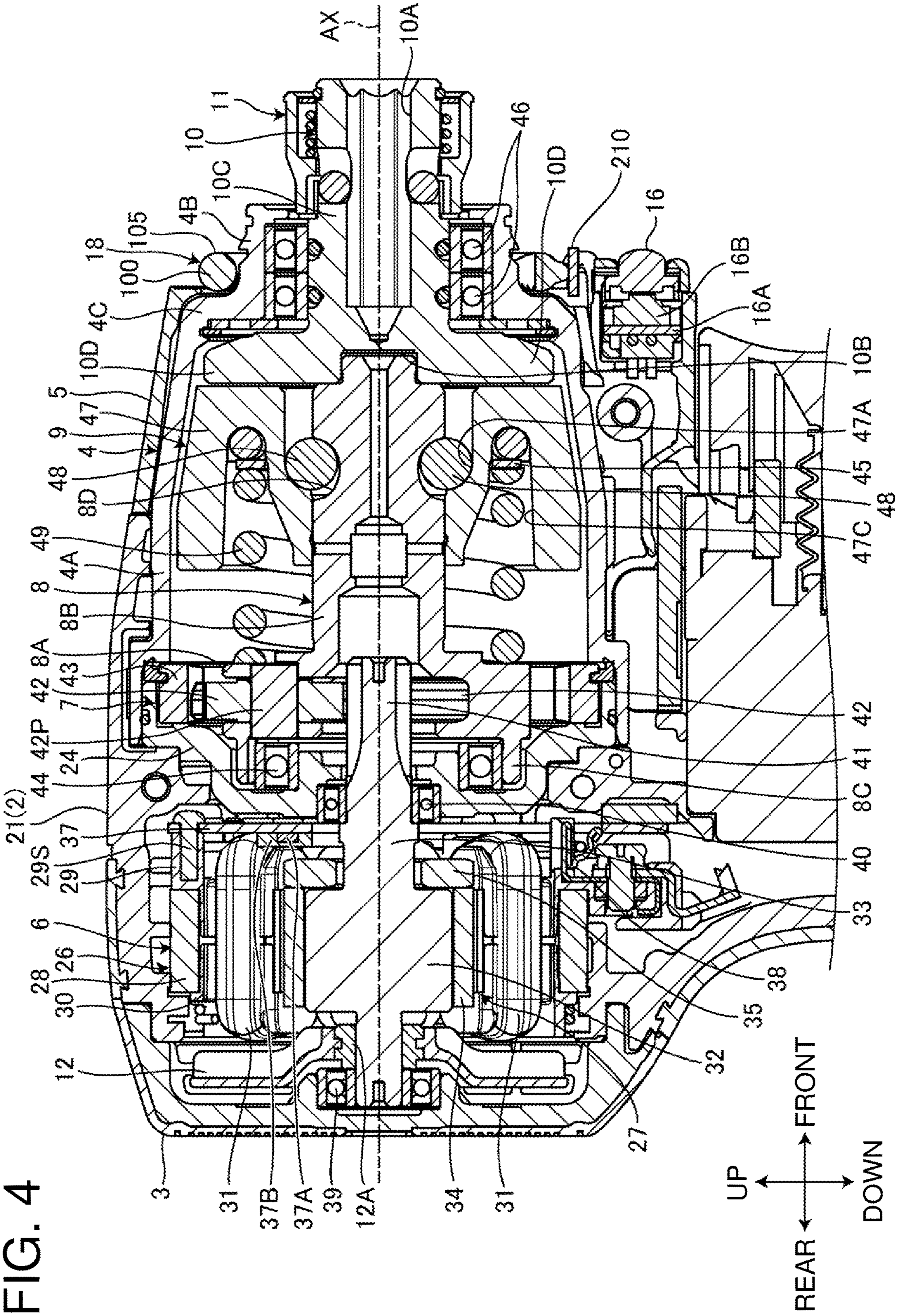
FIG. 4 is a longitudinal sectional view of the upper portion of the electric work machine according to the embodiment.
Figure 5:
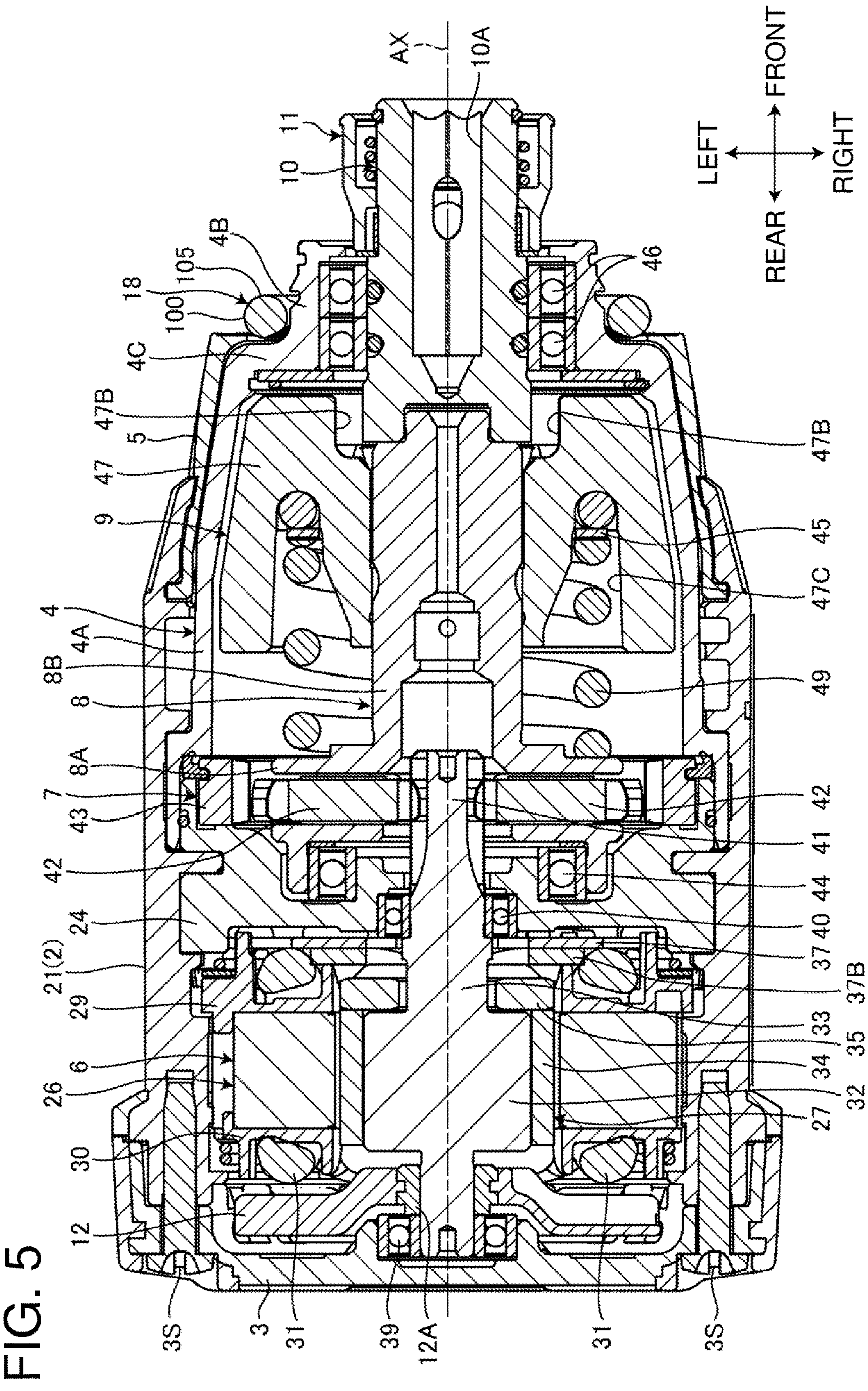
FIG. 5 is a horizontal sectional view of the upper portion of the electric work machine according to the embodiment.

FIG. 1 is a perspective view of an electric work machine 1 according to an embodiment as viewed from the front. FIG. 2 is a front view of an upper portion of the electric work machine 1. FIG. 3 is a side view of the upper portion of the electric work machine 1. FIG. 4 is a longitudinal sectional view of the upper portion of the electric work machine 1. FIG. 5 is a horizontal sectional view of the upper portion of the electric work machine 1.

The electric work machine 1 according to the present embodiment is a power tool including an electric motor 6 as a power source. A direction parallel to a rotation axis AX of the motor 6 is referred to as an axial direction for convenience. A direction about the rotation axis AX is referred to as a circumferential direction or circumferentially, or a rotation direction for convenience. A direction radial from the rotation axis AX is referred to as a radial direction or radially for convenience. A position nearer the rotation axis AX in the radial direction, or a radial direction toward the rotation axis AX, is referred to as radially inward for convenience. A position farther from the rotation axis AX in the radial direction, or a radial direction away from the rotation axis AX, is referred to as radially outside or radially outward for convenience. The rotation axis AX in the present embodiments extends in the front-rear direction. A first axial direction is from the rear to the front. A second axial direction is from the front to the rear.

The electric work machine 1 according to the present embodiment is an impact tool as an example of a power tool. The electric work machine 1 is hereafter referred to as an impact tool 1 as appropriate.

The impact tool 1 according to the present embodiment is an impact driver as a screwing tool. The impact tool 1 includes a housing 2, a rear cover 3, a hammer case 4, a case cover 5, a motor 6, a reducer 7, a spindle 8, a striker 9, an anvil 10, a tool holder 11, a fan 12, a battery mount 13, a trigger lever 14, a forward-reverse switch lever 15, a mode switch hand button 16, and a light unit 18.

The housing 2 is formed from a synthetic resin. The housing 2 in the present embodiment is formed from nylon. The housing 2 includes a left housing 2L and a right housing 2R. The right housing 2R is located on the right of the left housing 2L. The left and right housings 2L and 2R are fastened together with multiple screws 2S. The housing 2 includes a pair of housing halves.

The housing 2 includes a motor compartment 21, a grip 22, and a battery holder 23.

The motor compartment 21 is cylindrical. The motor compartment 21 accommodates the motor 6, a part of a bearing box 24, and a rear portion of the hammer case 4.

The grip 22 protrudes downward from the motor compartment 21. The trigger lever 14 is located in an upper portion of the grip 22. The grip 22 is grippable by an operator.

The battery holder 23 is connected to the lower end of the grip 22. The battery holder 23 has larger outer dimensions than the grip 22 in the front-rear direction and in the lateral direction.

The rear cover 3 is formed from a synthetic resin. The rear cover 3 is located behind the motor compartment 21. The rear cover 3 accommodates at least a part of the fan 12. The fan 12 is located circumferentially inward from the rear cover 3. The rear cover 3 covers an opening at the rear end of the motor compartment 21. The rear cover 3 is fastened to the rear end of the motor compartment 21 with screws 3S.

The motor compartment 21 has inlets 19. The rear cover 3 has outlets 20. Air outside the housing 2 flows into an internal space of the housing 2 through the inlets 19, and then flows out of the housing 2 through the outlets 20.

The hammer case 4 serves as a gear case accommodating the reducer 7. The hammer case 4 accommodates at least parts of the reducer 7, the spindle 8, the striker 9, and the anvil 10. The hammer case 4 is formed from a metal. The hammer case 4 in the present embodiment is formed from aluminum. The hammer case 4 is cylindrical.

The hammer case 4 includes a rear cylinder 4A, a front cylinder 4B, and an annular portion 4C. The front cylinder 4B is located frontward from the rear cylinder 4A. The rear cylinder 4A has a larger outer diameter than the front cylinder 4B. The rear cylinder 4A has a larger inner diameter than the front cylinder 4B. The annular portion 4C connects the front end of the rear cylinder 4A and the rear end of the front cylinder 4B.

The hammer case 4 is connected to the front of the motor compartment 21. The bearing box 24 is fixed to a rear portion of the rear cylinder 4A. The reducer 7 is at least partially located inside the bearing box 24. The bearing box 24 has a thread on its outer periphery. The rear portion of the rear cylinder 4A has a threaded groove on its inner periphery. The thread on the bearing box 24 is engaged with the threaded groove on the rear cylinder 4A to fasten the bearing box 24 and the hammer case 4 together. The hammer case 4 is held between the left housing 2L and the right housing 2R. The motor compartment 21 accommodates apart of the bearing box 24 and the rear portion of the rear cylinder 4A. The bearing box 24 is fixed to the motor compartment 21 and the hammer case 4.

The case cover 5 covers at least apart of the surface of the hammer case 4. The case cover 5 in the present embodiment covers the surface of the rear cylinder 4A. The case cover 5 is formed from a synthetic resin. The case cover 5 in the present embodiment is formed from a polycarbonate resin. The case cover 5 protects the hammer case 4. The case cover 5 prevents contact between the hammer case 4 and objects around the impact tool 1. The case cover 5 prevents contact between the hammer case 4 and the operator.

The motor 6 is a power source for the impact tool 1. The motor 6 generates a rotational force. The motor 6 is an electric motor. The motor 6 is an inner-rotor brushless motor. The motor 6 includes a stator 26 and a rotor 27. The stator 26 is supported on the motor compartment 21. The rotor 27 is at least partially located inward from the stator 26. The rotor 27 rotates relative to the stator 26. The rotor 27 rotates about the rotation axis AX extending in the front-rear direction.

The stator 26 includes a stator core 28, a front insulator 29, a rear insulator 30, and multiple coils 31.

The stator core 28 is located radially outside the rotor 27. The stator core 28 includes multiple steel plates stacked on one another. The steel plates are metal plates containing iron as a main component. The stator core 28 is cylindrical. The stator core 28 has multiple teeth to support the coils 31.

The front insulator 29 is located on the front of the stator core 28. The rear insulator 30 is located on the rear of the stator core 28. The front insulator 29 and the rear insulator 30 are electrical insulating members formed from a synthetic resin. The front insulator 29 partially covers the surfaces of the teeth. The rear insulator 30 partially covers the surfaces of the teeth.

The coils 31 are attached to the stator core 28 with the front insulator 29 and the rear insulator 30 in between. The coils 31 surround the teeth in the stator core 28 with the front insulator 29 and the rear insulator 30 in between. The coils 31 and the stator core 28 are electrically insulated from each other with the front insulator 29 and the rear insulator 30. The coils 31 are connected to one another with fusing terminals 38.

The rotor 27 rotates about the rotation axis AX. The rotor 27 includes a rotor core 32, a rotor shaft 33, a rotor magnet 34, and a sensor magnet 35.

The rotor core 32 and the rotor shaft 33 are formed from steel. In the present embodiment, the rotor core 32 is integral with the rotor shaft 33. The rotor shaft 33 has a front portion protruding frontward from the front end face of the rotor core 32. The rotor shaft 33 has a rear portion protruding rearward from the rear end face of the rotor core 32.

The rotor magnet 34 is fixed to the rotor core 32. The rotor magnet 34 is cylindrical. The rotor magnet 34 surrounds the rotor core 32.

The sensor magnet 35 is fixed to the rotor core 32. The sensor magnet 35 is annular. The sensor magnet 35 is located on the front end face of the rotor core 32 and the front end face of the rotor magnet 34.

A sensor board 37 is attached to the front insulator 29. The sensor board 37 is fastened to the front insulator 29 with a screw 29S. The sensor board 37 includes an annular circuit board, a magnetic sensor 37A, and a resin-molded part 37B. The magnetic sensor 37A is supported on the circuit board. The resin-molded part 37B covers the magnetic sensor 37A. The sensor board 37 at least partially faces the sensor magnet 35. The magnetic sensor 37A detects the position of the sensor magnet 35 to detect the position of the rotor 27 in the rotation direction.

The rotor shaft 33 includes a rear portion rotatably supported by a rotor bearing 39. The rotor shaft 33 includes a front portion rotatably supported by a rotor bearing 40. The rotor bearing 39 is held on the rear cover 3. The rotor bearing 40 is held on the bearing box 24. The rotor shaft 33 has its front end located in an internal space of the hammer case 4 through an opening in the bearing box 24.

The rotor shaft 33 receives a pinion gear 41 on the front end. The pinion gear 41 is connected to at least a part of the reducer 7. The rotor shaft 33 is connected to the reducer 7 with the pinion gear 41 in between.

The reducer 7 transmits a rotational force from the motor 6 to the spindle 8 and the anvil 10. The reducer 7 is accommodated in the rear cylinder 4A in the hammer case 4. The reducer 7 includes multiple gears. The reducer 7 is located frontward from the motor 6. The reducer 7 is located frontward from the rotor 27. The reducer 7 connects the rotor shaft 33 and the spindle 8 together. The rotor 27 drives the gears in the reducer 7. The reducer 7 transmits rotation of the rotor 27 to the spindle 8. The reducer 7 reduces rotation of the rotor 27. The reducer 7 rotates the spindle 8 at a lower rotational speed than the rotor shaft 33. The reducer 7 includes a planetary gear assembly.

The reducer 7 includes multiple planetary gears 42 and an internal gear 43. The multiple planetary gears 42 surround the pinion gear 41. The internal gear 43 surrounds the multiple planetary gears 42. The pinion gear 41, the planetary gears 42, and the internal gear 43 are accommodated in the hammer case 4 and the bearing box 24. Each planetary gear 42 meshes with the pinion gear 41. The planetary gears 42 are rotatably supported by the spindle 8 with a pin 42P. The spindle 8 is rotated by the planetary gears 42. The internal gear 43 includes internal teeth that mesh with the planetary gears 42. The internal gear 43 is fixed to the bearing box 24. The internal gear 43 is constantly nonrotatable relative to the bearing box 24.

When the rotor shaft 33 rotates as driven by the motor 6, the pinion gear 41 rotates, and the planetary gears 42 revolve about the pinion gear 41. The planetary gears 42 revolve while meshing with the internal teeth on the internal gear 43. The spindle 8, which is connected to the planetary gears 42 with the pin 42P in between, thus rotates at a lower rotational speed than the rotor shaft 33.

The spindle 8 rotates under a rotational force from the motor 6. The spindle 8 is located frontward from at least a part of the motor 6. The spindle 8 is located frontward from the stator 26. The spindle 8 is at least partially located frontward from the rotor 27. The spindle 8 is at least partially located frontward from the reducer 7. The spindle 8 is rotated by the rotor 27. The spindle 8 rotates under a rotational force from the rotor 27 transmitted by the reducer 7.

The spindle 8 includes a flange 8A and a spindle shaft 8B. The spindle shaft 8B protrudes frontward from the flange 8A. The planetary gears 42 are rotatably supported by the flange 8A with the pin 42P. The rotation axis of the spindle 8 aligns with the rotation axis AX of the motor 6. The spindle 8 rotates about the rotation axis AX.

The spindle 8 is rotatably supported by a spindle bearing 44. The spindle bearing 44 is held on the bearing box 24. The spindle 8 has a ring 8C. The ring 8C protrudes rearward from the rear of the flange 8A. The spindle bearing 44 is located inward from the ring 8C. The spindle bearing 44 in the present embodiment includes an outer ring connected to the ring 8C. The spindle bearing 44 includes an inner ring supported by the bearing box 24.

The striker 9 is driven by the motor 6. A rotational force from the motor 6 is transmitted to the striker 9 through the reducer 7 and the spindle 8. The striker 9 strikes the anvil 10 in the rotation direction in response to a rotational force of the spindle 8 rotated by the motor 6. The striker 9 includes a hammer 47, balls 48, and a coil spring 49. The striker 9 including the hammer 47 is accommodated in the hammer case 4.

The hammer 47 is located frontward from the reducer 7. The hammer 47 is accommodated in the rear cylinder 4A. The hammer 47 surrounds the spindle shaft 8B. The hammer 47 is held by the spindle shaft 8B. The balls 48 are located between the spindle shaft 8B and the hammer 47. The coil spring 49 is supported by the flange 8A and the hammer 47.

The hammer 47 is rotated by the motor 6. A rotational force from the motor 6 is transmitted to the hammer 47 through the reducer 7 and the spindle 8. The hammer 47 is rotatable together with the spindle 8 in response to a rotational force of the spindle 8 rotated by the motor 6. The rotation axis of the hammer 47 and the rotation axis of the spindle 8 align with the rotation axis AX of the motor 6. The hammer 47 rotates about the rotation axis AX.

The balls 48 are formed from a metal such as steel. The balls 48 are located between the spindle shaft 8B and the hammer 47. The spindle 8 has spindle grooves 8D. The spindle grooves 8D receive at least parts of the balls 48. The spindle grooves 8D are on the outer circumferential surface of the spindle shaft 8B. The hammer 47 has hammer grooves 47A. The hammer grooves 47A receive at least parts of the balls 48. The hammer grooves 47A are formed on a portion of the inner surface of the hammer 47. The balls 48 are located between the spindle grooves 8D and the hammer grooves 47A. The balls 48 roll along the spindle grooves 8D and the hammer grooves 47A. The hammer 47 is movable together with the balls 48. The spindle 8 and the hammer 47 are movable relative to each other in the axial direction and in the rotation direction within a movable range defined by the spindle grooves 8D and the hammer grooves 47A.

The coil spring 49 generates an elastic force for moving the hammer 47 forward. The coil spring 49 is located between the flange 8A and the hammer 47. An annular recess 47C is located on the rear surface of the hammer 47. The recess 47C is recessed frontward from the rear surface of the hammer 47. A washer 45 is received in the recess 47C. The rear end of the coil spring 49 is supported by the flange 8A. The front end of the coil spring 49 is received in the recess 47C and supported by the washer 45.

The anvil 10 is an output unit of the impact tool 1 that operates on a rotational force from the motor 6. The anvil 10 rotates under a rotational force from the motor 6. The anvil 10 is an output shaft of the impact tool 1 rotatable by the reducer 7. The anvil 10 is at least partially located frontward from the hammer 47. The anvil 10 has a tool hole 10A. The tool hole 10A receives a tip tool. The tip tool is, for example, a screwdriver bit. The anvil 10 has the tool hole 10A at its front end. The tip tool is attached to the anvil 10. The anvil 10 has a recess 10B at its rear end. The spindle shaft 8B includes a protrusion at its front end. The protrusion at the front end of the spindle shaft 8B is received in a recess 10B at the rear end of the anvil 10.

The anvil 10 includes a rod-like anvil shaft 10C and anvil projections 10D. The tool hole 10A is located at the front end of the anvil shaft 10C. The tip tool is attached to the anvil shaft 10C. The anvil projections 10D are located at the rear end of the anvil 10. The anvil projections 10D protrude radially outward from the rear end of the anvil shaft 10C.

The anvil 10 is rotatably supported by anvil bearings 46. The rotation axis of the anvil 10, the rotation axis of the hammer 47, and the rotation axis of the spindle 8 align with the rotation axis AX of the motor 6. The anvil 10 rotates about the rotation axis AX. The anvil bearings 46 are located inward from the front cylinder 4B. The anvil bearings 46 are held on the front cylinder 4B in the hammer case 4. The hammer case 4 accommodates the reducer 7. The hammer case 4 supports the anvil 10 in a rotatable manner with the anvil bearings 46 in between. The anvil bearings 46 support the anvil shaft 10C. In the present embodiment, two anvil bearings 46 are arranged in the front-rear direction.

The hammer 47 includes hammer projections 47B protruding frontward. The hammer projections 47B can come in contact with the anvil projections 10D. When the motor 6 operates with the hammer projections 47B and the anvil projections 10D in contact with each other, the anvil 10 rotates together with the hammer 47 and the spindle 8.

The anvil 10 is struck by the hammer 47 in the rotation direction. When the anvil 10 receives a higher load in a screwing operation, for example, the anvil 10 may fail to rotate with power generated by the motor 6 alone. This stops rotation of the anvil 10 and the hammer 47. The spindle 8 and the hammer 47 are movable relative to each other in the axial direction and in the circumferential direction through the balls 48. Although the hammer 47 stops rotating, the spindle 8 continues to rotate with power generated by the motor 6. When the hammer 47 stops rotating and the spindle 8 continues to rotate, the balls 48 move backward as guided along the spindle groove 8D and the hammer groove 47A. The hammer 47 receives a force from the balls 48 to move backward with the balls 48. In other words, the hammer 47 moves backward when the anvil 10 stops rotating and the spindle 8 rotates. Thus, the hammer projections 47B come out of contact with the anvil projections 10D.

The coil spring 49 generates an elastic force for moving the hammer 47 forward. The hammer 47 that has moved backward moves forward under the elastic force from the coil spring 49. When moving forward, the hammer 47 receives a force in the rotation direction from the balls 48. In other words, the hammer 47 moves forward while rotating. The hammer projections 47B then come in contact with the anvil projections 10D while rotating. Thus, the anvil projections 10D are struck by the hammer projections 47B in the rotation direction. The anvil 10 receives power from the motor 6 and an inertial force from the hammer 47. The anvil 10 thus rotates with high torque about the rotation axis AX.

The tool holder 11 surrounds a front portion of the anvil 10. The tool holder 11 holds the tip tool received in the tool hole 10A.

The fan 12 rotates under a rotational force from the motor 6. The fan 12 is located rearward from the stator 26 in the motor 6. The fan 12 generates an airflow for cooling the motor 6. The fan 12 is fastened to at least a part of the rotor 27. The fan 12 is fastened to a rear portion of the rotor shaft 33 with a bush 12A. The fan 12 is between the rotor bearing 39 and the stator 26. The fan 12 rotates as the rotor 27 rotates. As the rotor shaft 33 rotates, the fan 12 rotates together with the rotor shaft 33. Thus, air outside the housing 2 flows into the internal space of the housing 2 through the inlets 19 and cools the motor 6. As the fan 12 rotates, the air passing through the housing 2 flows out of the housing 2 through the outlets 20.

The battery mount 13 is located in a lower portion of the battery holder 23. A battery pack 25 is attached to the battery mount 13 in a detachable manner. The battery pack 25 serves as a power supply for the impact tool 1. The battery pack 25 includes a secondary battery. The battery pack 25 in the present embodiment includes a rechargeable lithium-ion battery. The battery pack 25 is attached to the battery mount 13 to power the impact tool 1. The motor 6 and the light unit 18 are driven by power supplied from the battery pack 25.

The trigger lever 14 is located on the grip 22. The trigger lever 14 is operable by the operator to activate the motor 6. The trigger lever 14 is operable to switch the motor 6 between the driving state and the stopped state.

The forward-reverse switch lever 15 is located above the grip 22. The forward-reverse switch lever 15 is operable by the operator. The forward-reverse switch lever 15 is operable to switch the rotation direction of the motor 6 between forward and reverse. This operation switches the rotation direction of the spindle 8.

The mode switch hand button 16 is located above the trigger lever 14. The mode switch hand button 16 is operable by the operator. A circuit board 16A and a switch 16B are located behind the mode switch hand button 16. The switch 16B is mounted on the front surface of the circuit board 16A. The mode switch hand button 16 is located in front of the switch 16B. In response to the mode switch hand button 16 being pushed backward, the switch 16B operates to output an operation signal from the circuit board 16A. The operation signal output from the circuit board 16A is transmitted to a controller (not shown). The controller switches the control mode of the motor 6 based on the operation signal output from the circuit board 16A.

Light Unit

Figure 6:
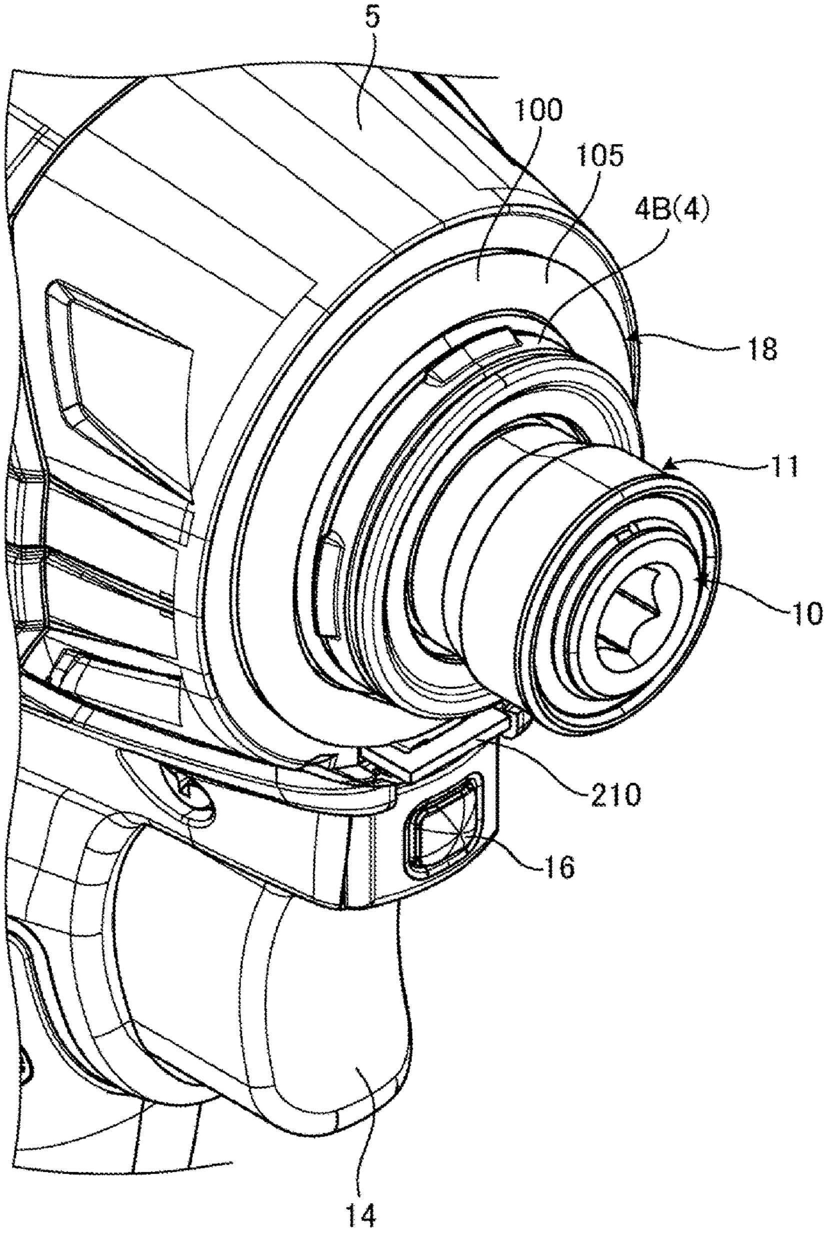
FIG. 6 is a perspective view of the upper portion of the electric work machine according to the embodiment as viewed from the front.
Figure 6:
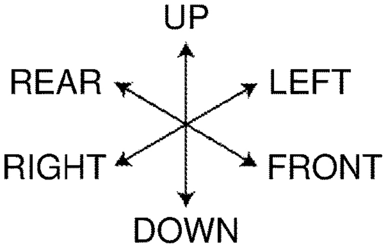
Figure 7:
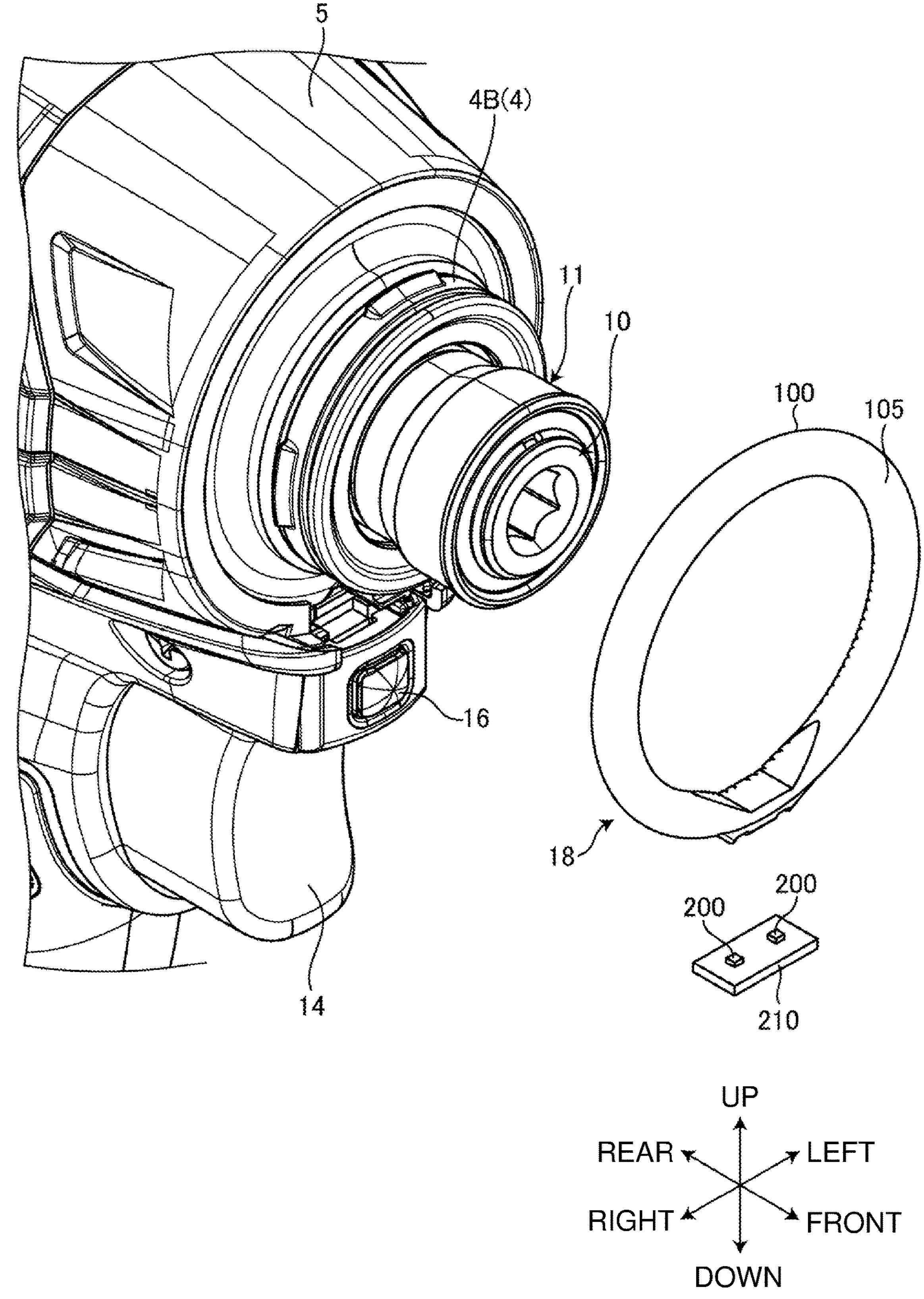
FIG. 7 is an exploded perspective view of the upper portion of the electric work machine according to the embodiment as viewed from the front.
Figure 8:
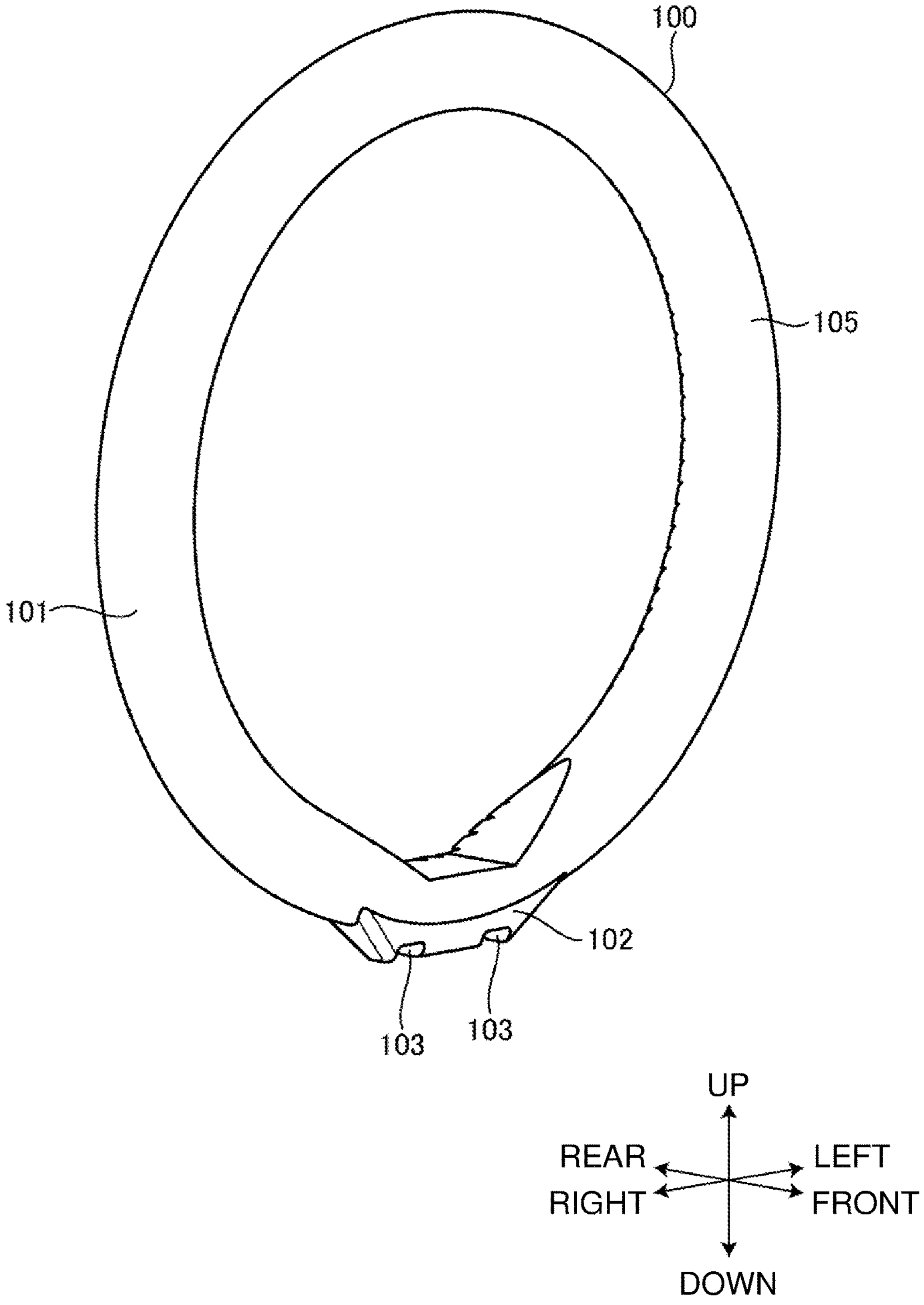
FIG. 8 is a perspective view of an optical member in the embodiment as viewed from the front.
Figure 9:
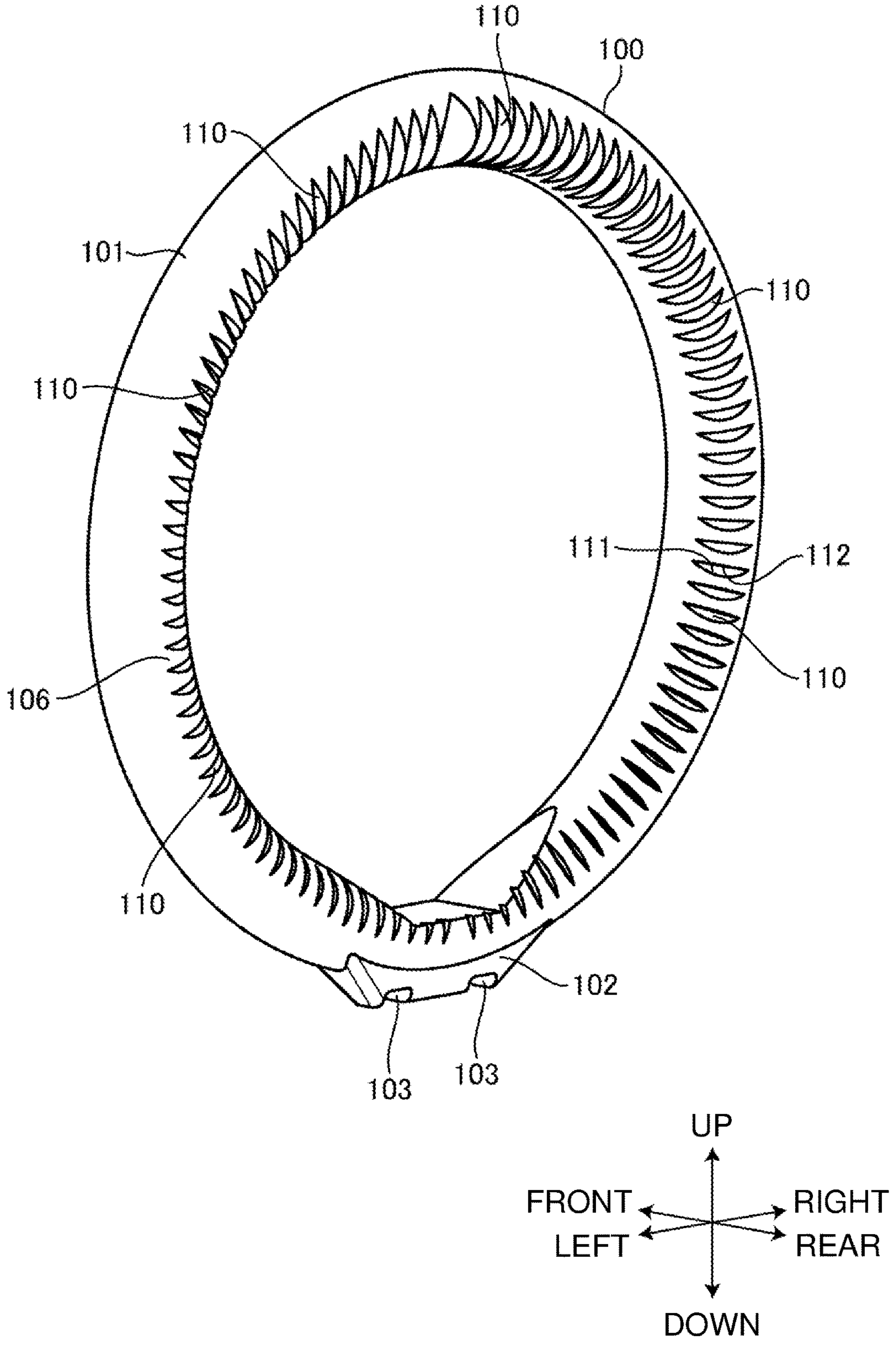
FIG. 9 is a perspective view of the optical member in the embodiment as viewed from the rear.
Figure 10:
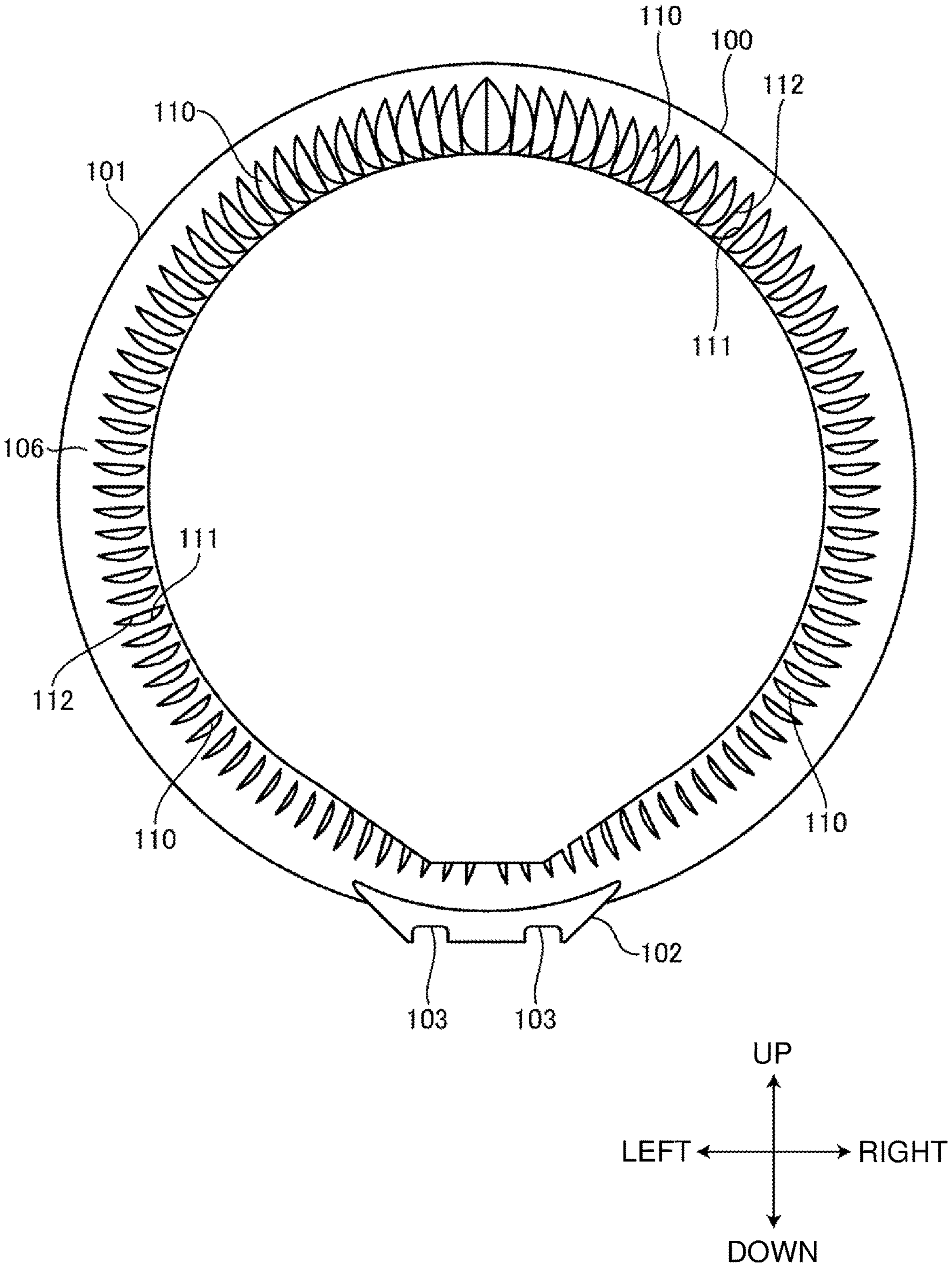
FIG. 10 is a rear view of the optical member in the embodiment.
Figure 11:
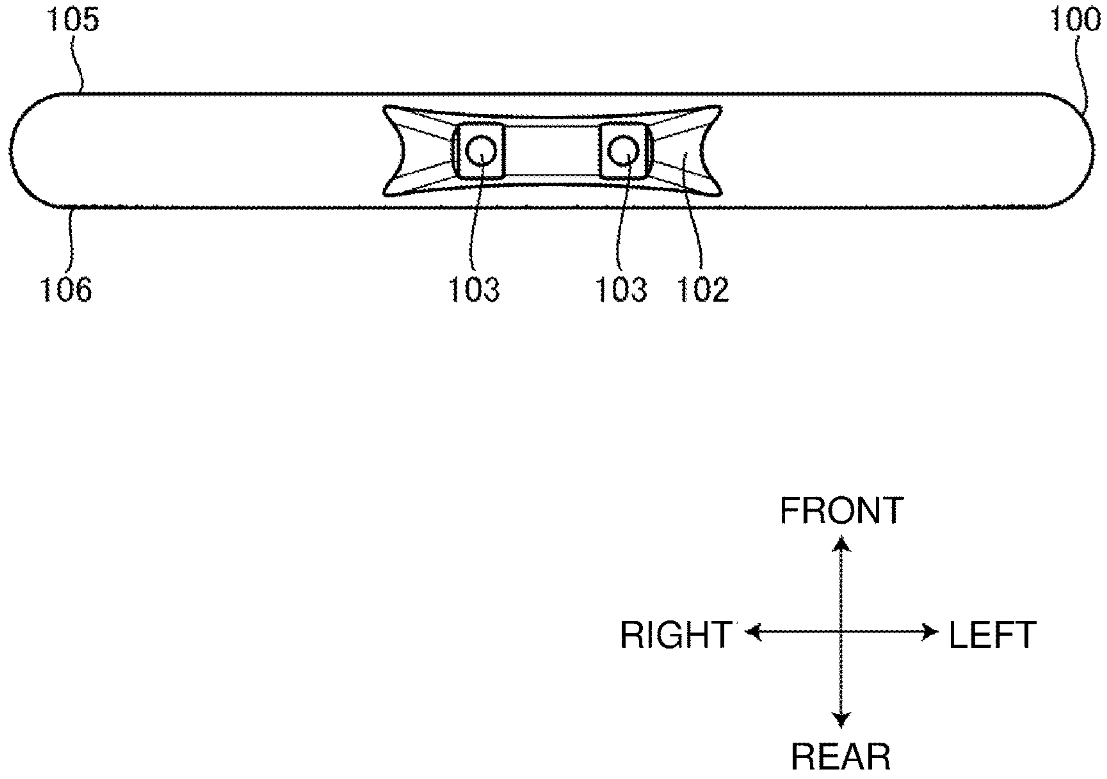
FIG. 11 is a bottom view of the optical member in the embodiment.
Figure 12:
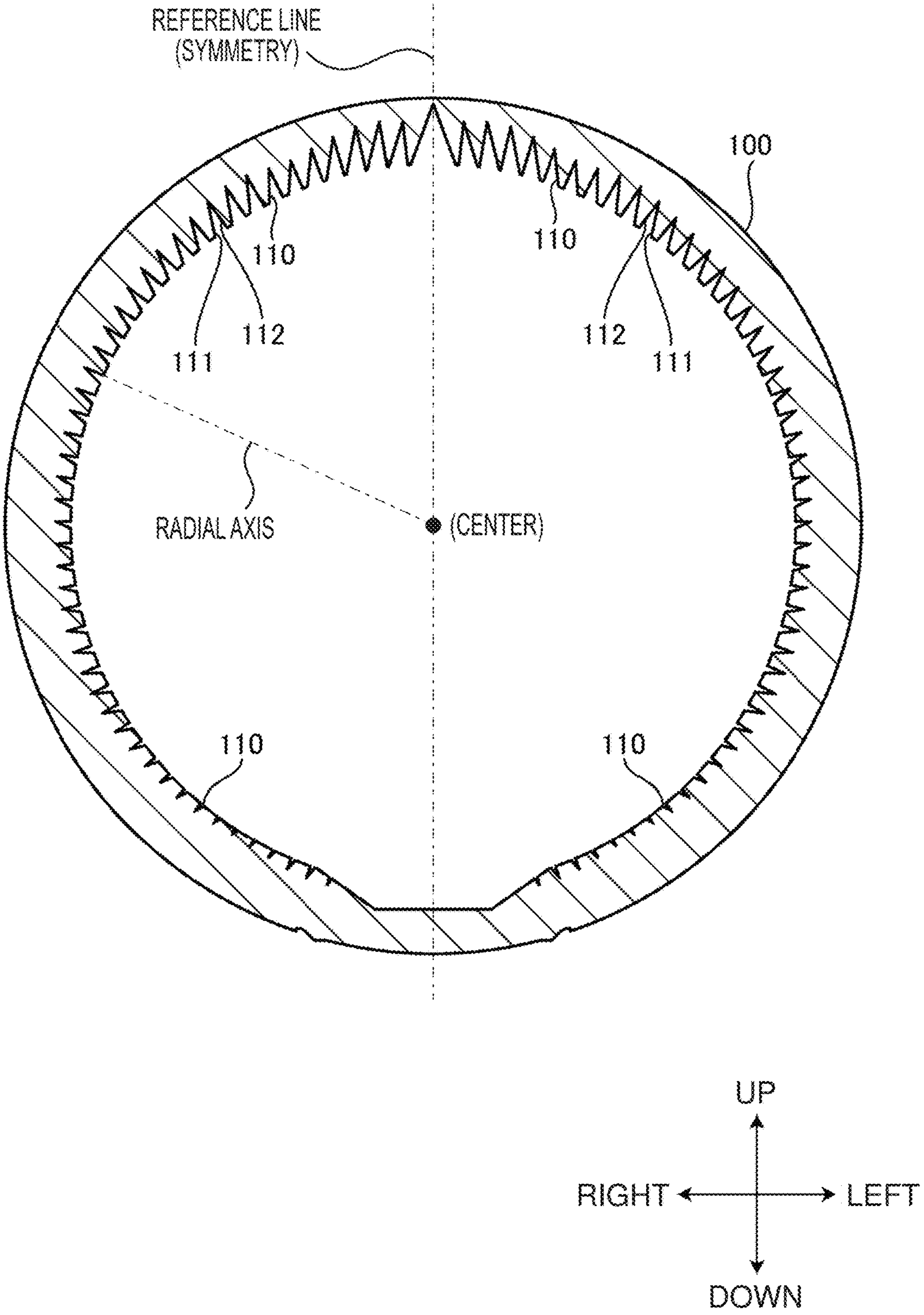
FIG. 12 is a cross-sectional view of the optical member in the embodiment.
Figure 13:
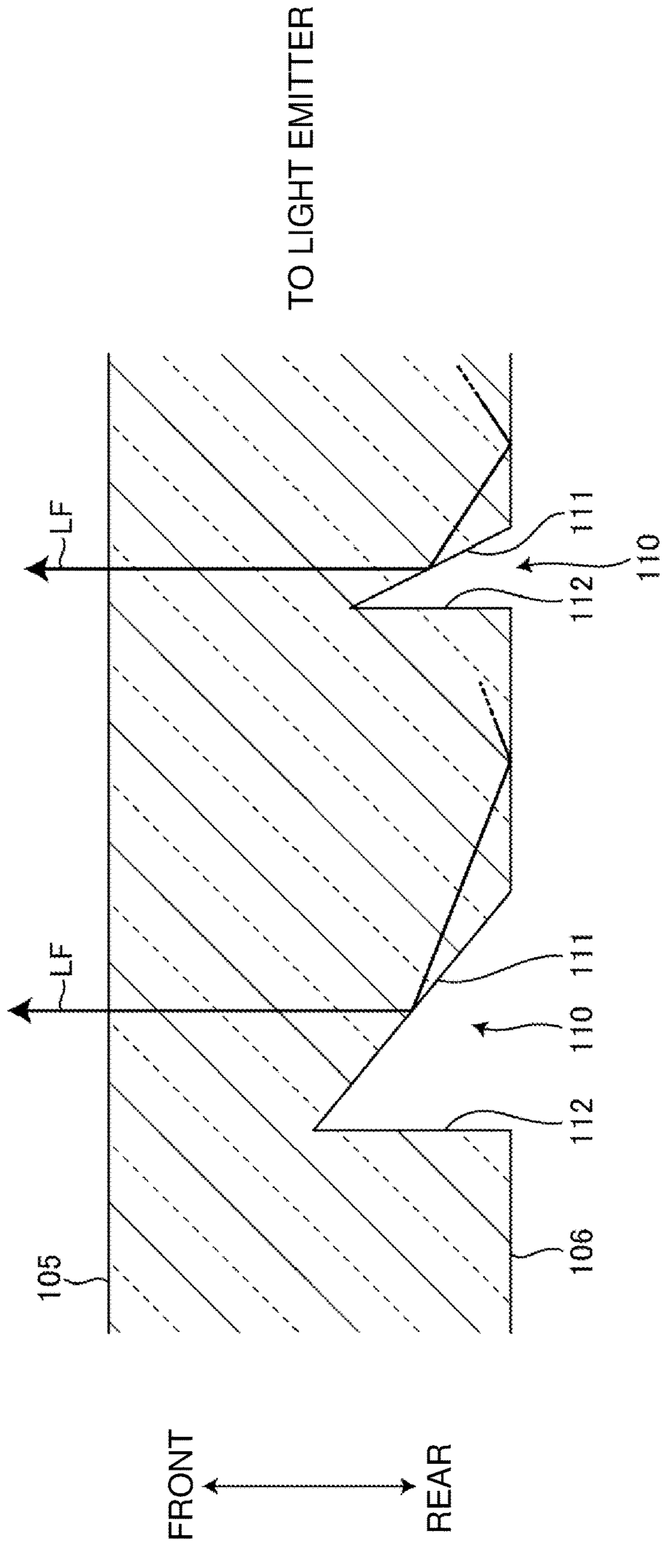
FIG. 13 is a partial schematic view of the optical member in the embodiment.

FIG. 6 is a perspective view of an upper portion of the impact tool 1 according to the present embodiment as viewed from the front. FIG. 7 is an exploded perspective view of the upper portion of the impact tool 1 as viewed from the front. FIG. 8 is a perspective view of an optical member 100 as viewed from the front. FIG. 9 is a perspective view of the optical member 100 as viewed from the rear. FIG. 10 is a rear view of the optical member 100. FIG. 11 is a bottom view of the optical member 100. FIG. 12 is a cross-sectional view of the optical member 100. FIG. 13 is a partial schematic view of the optical member 100.

The light unit 18 emits illumination light. The light unit 18 illuminates the anvil 10 and an area around the anvil 10 with illumination light. The light unit 18 illuminates an area ahead of the anvil 10 with illumination light. The light unit 18 also illuminates the tip tool attached to the anvil 10 and an area around the tip tool with illumination light.

The light unit 18 is located in a front portion of the hammer case 4. The light unit 18 surrounds the front cylinder 4B. The light unit 18 surrounds the anvil shaft 10C with the front cylinder 4B in between. The light unit 18 is fixed to at least apart of the hammer case 4. The light unit 18 may be fixed to at least a part of the housing 2.

The light unit 18 includes light emitters 200 and the optical member 100. The light emitters 200 are supported on a substrate 210. Light from the light emitters 200 is emitted forward through the optical member 100. The optical member 100 is formed from, for example, a synthetic resin such as a polycarbonate resin. The optical member 100 may be formed from glass. The light emitters 200 and the substrate 210 are located below the optical member 100. Each light emitter 200 includes a light-emitting diode (LED). In the present embodiment, the light emitters 200 are mounted on the upper surface of the substrate 210. In the present embodiment, two light emitters 200, or a left light emitter 200 and a right light emitter 200, are located at an interval. The substrate 210 includes a circuit board that can control light emission from the light emitters 200. The light emitters 200 and the substrate 210 may be included in chip-on-board (COB) LEDs.

The optical member 100 is an annular optical member. The optical member 100 includes alight guide 101 and a protrusion 102. The light guide 101 surrounds at least parts of the anvil shaft 10C and the front cylinder 4B. The protrusion 102 protrudes downward from a lower portion of the light guide 101. The light guide 101 in the present embodiment surrounds the anvil shaft 10C and the front cylinder 4B. The light guide 101 is annular. The protrusion 102 includes light receivers 103 on its lower surface. The light receivers 103 face the respective light emitters 200. Each light emitter 200 faces the corresponding light receiver 103. In the present embodiment, two light receivers 103, or a left light receiver 103 and a right light receiver 103, are located on the lower surface of the protrusion 102 at an interval. Light emitted from each light emitter 200 is incident on the corresponding light receiver 103. Light entering an internal space of the optical member 100 through the light receivers 103 travels through the light guide 101.

The light guide 101 has a front surface 105 facing frontward and a rear surface 106 facing rearward. The light guide 101 is a substantially cylindrical member bent into a ring. The front surface 105 and the rear surface 106 each include a curved surface. Light traveling through the light guide 101 is at least partially emitted forward through the front surface 105. The front surface 105 of the light guide 101 is a light-emitting surface through which light from the light receivers 103 is emitted forward.

The light guide 101 has multiple slits 110 on the rear surface 106. The slits 110 are located at intervals in the circumferential direction of the light guide 101. The slits 110 are recessed frontward from the rear surface 106. Each slit 110 is defined by a first surface 111 and a second surface 112. The first surface 111 and the second surface 112 face each other across the opening of the slit 110. The second surface 112 is located farther from the light receivers 103 than the first surface 111.

As shown in FIGS. 9 and 10, the slits 110 nearer the light receivers 103 (light emitters 200) extend from the rear surface 106 to the inner circumferential surface of the light guide 101. The slits 110 farther from the light receivers 103 (light emitters 200) are substantially located on the rear surface 106 alone, and do not extend to the inner circumferential surface of the light guide 101.

Each second surface 112 is a flat surface substantially parallel to the front-rear axis and to the radial axis, where the front-rear axis is parallel to the rotation axis AX, and the radial axis extends radially from the rotation axis AX. The second surface 112 has a front end connected to the front end of the corresponding first surface 111. The first surface 111 is inclined rearward from its front end away from the second surface 112.

The angle defined between the first surface 111 and the second surface 112 is less than 90 degrees outside the light guide 101 (or the angle across the opening of the slit 110). The angle defined between the first surface 111 and the second surface 112 is 270 degrees or greater inside the light guide 101. The angle defined between the first surface 111 and the second surface 112 outside the light guide 101 (or the angle across the opening of the slit 110) is hereafter referred to as an external angle for convenience. The angle defined between the first surface 111 and the second surface 112 inside the light guide 101 is referred to as an internal angle for convenience.

As schematically shown in FIG. 13, the slits 110 nearer the light receivers 103 (light emitters 200) have smaller external angles. The slits 110 farther from the light receivers 103 (light emitters 200) are deeper (or have larger dimensions in the front-rear direction).

Light emitted from the light emitters 200 enters the internal space of the optical member 100 through the light receivers 103 and travels through the light guide 101. As shown in FIG. 13, a part of light LF traveling through the light guide 101 is totally reflected from the first surfaces 111 toward the front surface 105. The light LF reflected from the first surfaces 111 is emitted forward through the front surface 105. The first surfaces 111 each function as a reflector for reflecting light from the light receivers 103.

The multiple slits 110 are located at intervals in the circumferential direction of the light guide 101. The multiple first surfaces 111 are located at intervals in the circumferential direction of the light guide 101. A part of the light LF from the light receivers 103 is totally reflected from the first surface 111 of a first slit 110 and emitted forward through the front surface 105. Another part of the light LF from the light receivers 103 is transmitted through the first slit 110. A part of the light LF transmitted through the first slit 110 is totally reflected from the first surface 111 of a second slit 110 and emitted forward through the front surface 105. Another part of the light LF transmitted through the first slit 110 is transmitted through the second slit 110. A part of the light LF transmitted through the second slit 110 is totally reflected from the first surface 111 of a third slit 110 and emitted forward through the front surface 105. Another part of the light LF transmitted through the second slit 110 is transmitted through the third slit 110. Thus, the light LF from the light receivers 103 is distributed to the multiple slits 110. Each of the first surfaces 111 of the multiple slits 110 totally reflects the corresponding part of the light LF. The multiple slits 110 allow the light LF reflected from each first surface 111 to have uniform light intensity. In other words, the multiple slits 110 are formed to allow light reflected from the first surface 111 of the first slit 110 adjacent to the light receiver 103 to have substantially the same light intensity as light reflected from the first surface 111 of the second slit 110 farther from the light receiver 103 than the first surface 111 of the first slit 110. Each slit 110 is defined by, for example, its external angle (or internal angle) and depth.

The multiple slits 110 are line symmetric with respect to a reference line extending vertically through the center of the optical member 100. Light emitted from the left light emitter 200 and incident on the left light receiver 103 travels through a portion of the light guide 101 leftward from the center of the optical member 100. Light emitted from the right light emitter 200 and incident on the right light receiver 103 travels through a portion of the light guide 101 rightward from the center of the optical member 100.

As described above, the electric work machine 1 according to the embodiment includes the motor 6 including the rotor 27 rotatable about the rotation axis AX extending in the front-rear direction, the anvil 10 located frontward from the motor 6 and operable under a rotational force from the rotor 27 as an output unit, and the optical member 100 including the light receivers 103 and the light guide 101. The light receivers 103 receive light from the light emitters 200. The light guide 101 surrounds at least a part of the anvil 10 to allow light from the light receivers 103 to travel through the light guide 101. The light guide 101 has the rear surface 106 having the slits 110, and the front surface 105 to allow emission of light traveling through the light guide 101 and reflected at the slits 110.

With the above structure, the light guide 101 has the rear surface 106 having the slits 110. The light traveling through the light guide 101 and reflected at the slits 110 thus illuminates an intended illumination area. In other words, the slits 110 are optimized to illuminate an intended illumination area.

The slits 110 in the embodiment are each defined by the first surface 11 and the second surface 112 located farther from the light receivers 103 than the first surface 111 and facing the first surface 111 across the opening of the slit 110. The first surface 111 totally reflects a part of light traveling through the light guide 101.

The light totally reflected from the first surfaces 111 is thus emitted through the front surface 105 of the light guide 101.

In the embodiment, the second surface 112 is a flat surface parallel to the front-rear axis and to the radial axis, where the front-rear axis is parallel to the rotation axis AX, and the radial axis extends radially from the rotation axis AX.

The second surface 112 is thus substantially perpendicular to the rear surface 106. The second surface 112 does not reflect light. With the second surface 112 perpendicular to the rear surface 106, the slit 110 is less likely to have a larger dimension in the circumferential direction. Many slits 110 can thus be located in the light guide 101.

In the embodiment, the second surface 112 has the front end connected to the front end of the first surface 111. The first surface 111 is inclined rearward from the front end of the first surface 111 away from the second surface 112.

This structure allows light from the light receivers 103 to be totally reflected from the first surfaces 111 and emitted through the front surface 105.

In the embodiment, the multiple slits 110 are located in the rear surface 106. The multiple slits 110 have external angles different from one another. Each external angle is defined between the first surface 111 and the second surface 112 across the opening of the corresponding slit 110.

The multiple slits 110 with the optimized external angles allow illumination of an intended illumination area with light.

In the embodiment, the multiple slits 110 nearer the light receivers 103 have smaller external angles.

This allows the multiple first surfaces 111 to each reflect light with a uniform intensity.

In the embodiment, the multiple slits 110 are located in the rear surface 106. The multiple slits 110 have depths different from one another.

The multiple slits 110 with the optimized depths allow illumination of an intended illumination area with light.

In the embodiment, the multiple slits 110 farther from the light receivers 103 are deeper.

This allows the multiple first surfaces 111 to each reflect light with a uniform intensity.

The light guide 101 in the embodiment is annular. The multiple slits 110 are located at intervals in the circumferential direction of the light guide 101. This allows illumination of an intended illumination area with light.

In the embodiment, the multiple slits 110 are line symmetric with respect to the reference line extending vertically through the center of the optical member 100. The left light receiver 103 and the right light receiver 103 are located at an interval. The left light receiver 103 receives light to travel through the portion of the light guide 101 leftward from the center of the optical member 100. The right light receiver 103 receives light to travel through the portion of the light guide 101 rightward from the center of the optical member 100.

This structure allows illumination of an intended illumination area with light.

Other Embodiments

In the above embodiment, the impact tool 1 is an impact driver. The impact tool 1 may be an impact wrench.

In the above embodiment, the electric work machine 1 is an impact tool as an example of a power tool. The power tool is not limited to an impact tool. Examples of the power tool include a driver drill, an angle drill, a screwdriver, a hammer, a hammer drill, a circular saw, and a reciprocating saw.

In the above embodiment, the electric work machine may use utility power (alternating current power supply) in place of the battery pack 25.

Reference Signs List

1 electric work machine (impact tool)
2 housing
2L left housing
2R right housing
2S screw
3 rear cover
3S screw
4 hammer case
4A rear cylinder
4B front cylinder
4C annular portion
5 case cover
6 motor
7 reducer
8 spindle
8A flange
8B spindle shaft
8C ring
8D spindle groove
9 striker
10 anvil (output unit)
10A tool hole
10B recess
10C anvil shaft
10D anvil projection
11 tool holder
12 fan
12A bush
13 battery mount
14 trigger lever
15 forward-reverse switch lever

16 mode switch hand button
16A circuit board
16B switch
18 light unit
19 inlet
20 outlet
21 motor compartment
22 grip
23 battery holder
24 bearing box
25 battery pack
26 stator
27 rotor
28 stator core
29 front insulator
29S screw
30 rear insulator
31 coil
32 rotor core
33 rotor shaft
34 rotor magnet
35 sensor magnet
37 sensor board
37A magnetic sensor
37B resin-molded part
38 fusing terminal
39 rotor bearing
40 rotor bearing
41 pinion gear
42 planetary gear
42P pin
43 internal gear
44 spindle bearing
45 washer
46 anvil bearing
47 hammer
47A hammer groove
47B hammer projection
47C recess
48 ball
49 coil spring
100 optical member
101 light guide
102 protrusion
103 light receiver
105 front surface
106 rear surface
110 slit
111 first surface
112 second surface
200 light emitter
210 substrate
AX rotation axis

What is claimed is:

1. An electric work machine, comprising:
a motor including a rotor rotatable about a rotation axis;
an output unit located toward a first end of the electric work machine relative to the motor and operable under a rotational force from the rotor;
a light emitter; and
an optical member including
at least one light receiver configured to receive light from the light emitter, and
a light guide surrounding at least a part of the output unit to allow light from the at least one light receiver to travel through the light guide, the light guide having a second guide surface having at least one slit, and a first guide surface to allow emission of light traveling through the light guide and reflected at the at least one slit,
wherein
the at least one slit is defined by a first slit surface and a second slit surface located farther from the at least one light receiver than the first slit surface and facing the first slit surface across an opening of the at least one slit,
the first slit surface totally reflects a part of light traveling through the light guide, and
the second slit surface is a flat surface parallel to a first axis and to a radial axis, where the first axis is parallel to the rotation axis, and the radial axis extends radially from the rotation axis.

2. The electric work machine according to claim 1, wherein
the second slit surface has a first end connected to a first end of the first slit surface, and
the first slit surface is inclined toward a second end of the electric work machine from the first end of the first slit surface away from the second slit surface.

3. The electric work machine according to claim 1, wherein
the at least one slit includes a plurality of slits located in the second guide surface, and
the plurality of slits have external angles different from one another, and each of the external angles is defined between the first slit surface and the second slit surface across an opening of a corresponding slit of the plurality of slits.

4. The electric work machine according to claim 3, wherein
a slit of the plurality of slits nearer the at least one light receiver has a smaller external angle than a slit farther from the at least one light receiver.

5. The electric work machine according to claim 1, wherein
the at least one slit includes a plurality of slits located in the second guide surface, and
the plurality of slits have depths different from one another.

6. The electric work machine according to claim 5, wherein
a slit of the plurality of slits farther from the at least one light receiver is deeper than a slit closer to the at least one light receiver.

7. The electric work machine according to claim 1, wherein
the light guide is annular, and
the at least one slit includes a plurality of slits located at intervals in a circumferential direction of the light guide.

8. The electric work machine according to claim 1, wherein
the at least one slit includes a plurality of slits being line symmetric with respect to a reference line extending vertically through a center of the optical member,
the at least one light receiver includes a first light receiver and a second light receiver located at an interval,
the first light receiver receives light to travel through a portion of the light guide in a first direction from the center of the optical member, and
the second light receiver receives light to travel through a portion of the light guide in a second direction from the center of the optical member.

9. The electric work machine according to claim 2, wherein the at least one slit includes a plurality of slits located in the second guide surface, the plurality of slits have external angles different from one another, and each of the external angles is defined between the first slit surface and the second slit surface across an opening of a corresponding slit of the plurality of slits.

10. The electric work machine according to claim 2, wherein the at least one slit includes a plurality of slits located in the second guide surface, and the plurality of slits have depths different from one another.

11. The electric work machine according to claim 2, wherein the light guide is annular, and the at least one slit includes a plurality of slits located at intervals in a circumferential direction of the light guide.

* * * * *